(12) United States Patent
Himmelmann

(10) Patent No.: US 7,677,135 B2
(45) Date of Patent: Mar. 16, 2010

(54) ELECTROMECHANICAL POWER TRANSFER SYSTEM WITH MULTIPLE DYNAMOELECTRIC MACHINES

(75) Inventor: Richard A Himmelmann, Beloit, WI (US)

(73) Assignee: Hamilton Sundstrand Corporation, Windsor Locks, CO (US)

( * ) Notice: Subject to any disclaimer, the term of this patent is extended or adjusted under 35 U.S.C. 154(b) by 392 days.

(21) Appl. No.: 11/879,549

(22) Filed: Jul. 18, 2007

(65) Prior Publication Data

US 2009/0023549 A1 Jan. 22, 2009

(51) Int. Cl.
- F16H 3/72 (2006.01)
- F16H 37/06 (2006.01)
- B60K 1/00 (2006.01)
- B60K 16/00 (2006.01)
- F02D 25/00 (2006.01)

(52) U.S. Cl. .................. 74/661; 475/5; 477/6; 74/331; 180/65.1; 180/65.31; 180/65.7; 903/906; 903/907; 903/909; 903/914; 903/917; 290/4 C

(58) Field of Classification Search ............ 475/5; 74/325, 331, 661; 290/1 C, 4 R, 4 C; 903/903, 903/906, 907, 909, 912, 914, 917; 180/65.1, 180/65.31, 65.6, 65.7

See application file for complete search history.

(56) References Cited

U.S. PATENT DOCUMENTS

| | | | | |
|---|---|---|---|---|
| 3,173,526 A | * | 3/1965 | Eakin | 192/87.14 |
| 3,757,912 A | * | 9/1973 | Ball et al. | 477/5 |
| 4,868,406 A | * | 9/1989 | Glennon et al. | 290/4 R |
| 6,427,549 B1 | * | 8/2002 | Bowen | 74/331 |
| 7,140,461 B2 | * | 11/2006 | Morrow | 180/65.245 |
| 7,150,698 B2 | * | 12/2006 | Sakamoto et al. | 477/5 |
| 7,270,030 B1 | * | 9/2007 | Belloso | 74/661 |
| 2006/0112781 A1 | * | 6/2006 | Kuras et al. | 74/661 |

FOREIGN PATENT DOCUMENTS

JP 10309003 A * 11/1998

* cited by examiner

Primary Examiner—Tisha D Lewis
(74) Attorney, Agent, or Firm—Stephen G. Mican

(57) ABSTRACT

An electromechanical power transfer system for a vehicle, comprises: an electrical power source; a system controller; at least two dynamoelectric machines; an electrically engageable clutch for each machine; an input shaft coupled to the jack shaft; an output shaft coupled to a load presented by the vehicle; and at least two electrically engageable transmission gear sets for coupling the input shaft to the output shaft; wherein the system controller selectively engages each machine clutch and each transmission gear set.

6 Claims, 6 Drawing Sheets

ELECTROMECHANICAL POWER TRANSFER SYSTEM WITH MULTIPLE DYNAMOELECTRIC MACHINES

FIELD OF THE INVENTION

The invention relates to a controllable electromechanical source of motive power for a vehicle and more particularly to an electromechanical power transfer system for controlling motion of a vehicle that employs multiple dynamoelectric machines for superior performance and fault tolerance.

BACKGROUND OF THE INVENTION

A vehicle may use one or more dynamoelectric machines as a source of motive power. Such dynamoelectric machines may serve as a prime mover powered by an off-board electric power source, such as by way of a catenary wire or "third rail", or with an on-board electric power source, such as an electric battery. Alternatively, they may serve as part of a power train for some other type of prime mover, such as an internal combustion engine, wherein the engine may drive one dynamoelectric machine as an electric generator and one or more additional dynamoelectric machines serve as electric motors powered by the generator that drive one or more wheels for the vehicle. A dynamoelectric machine may also serve both motor and generator functions, wherein such a machine may accelerate and de-accelerate the vehicle.

When a vehicle has a prime mover of the dynamoelectric machine type wherein power transfer from the prime mover must be sufficient to control the movement of the entire vehicle, the dynamoelectric machine must have sufficient torque and power to control the vehicle under worst-case conditions. In some cases the size and weight of such a machine exceeds design requirements for the vehicle. Furthermore, a fault that occurs in such a machine results in total failure of the vehicle.

SUMMARY OF THE INVENTION

The invention generally comprises an electromechanical power transfer system for a vehicle, comprising: an electrical power source; a system controller; at least two dynamoelectric machines; an electrically engageable clutch for each machine; an input shaft coupled to the jack shaft; an output shaft coupled to a load presented by the vehicle; and at least two electrically engageable transmission gear sets for coupling the input shaft to the output shaft; wherein the system controller selectively engages each machine clutch and each transmission gear set.

DETAILED DESCRIPTION OF THE INVENTION

Figure 1:
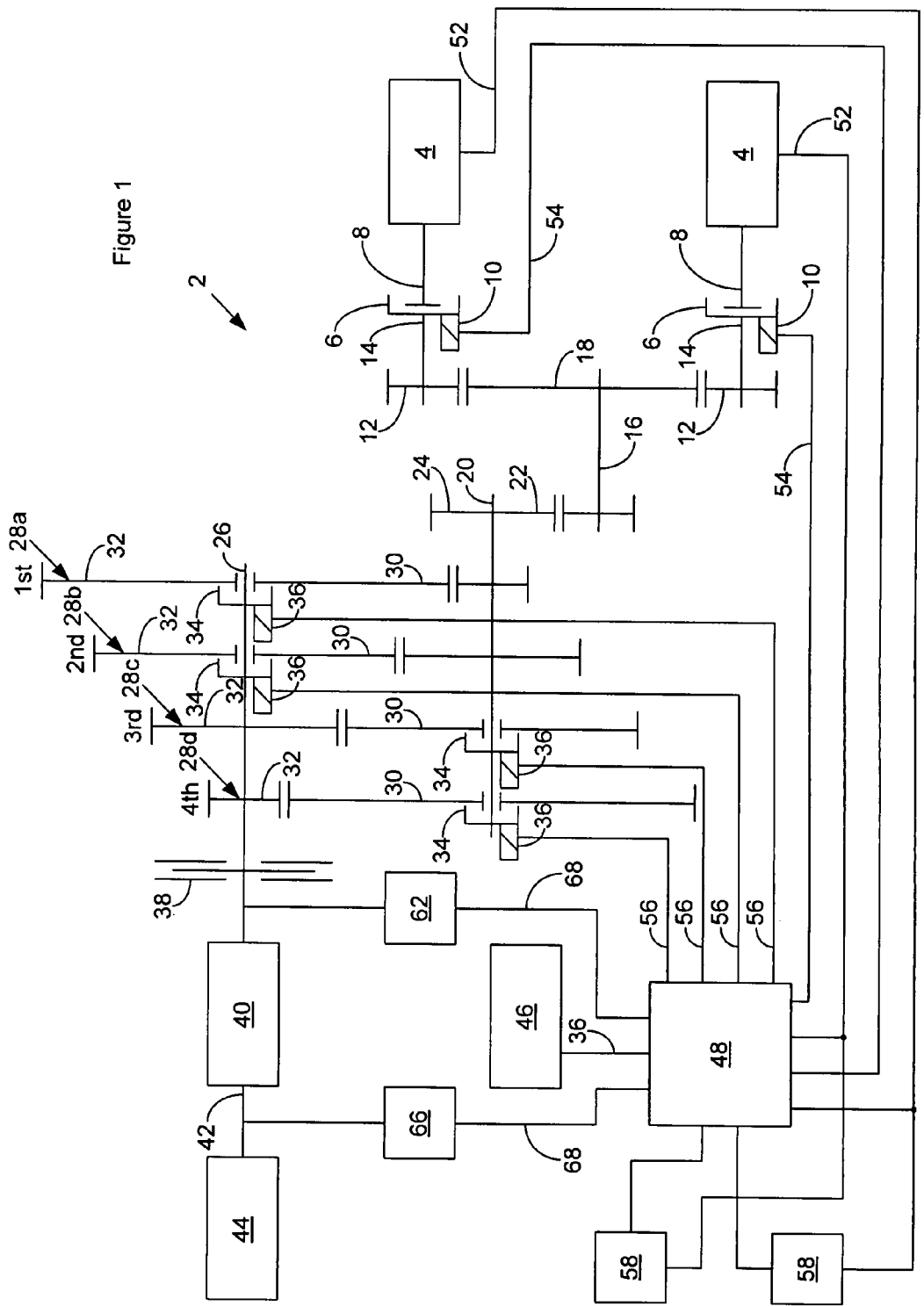
FIG. 1 is a high-level schematic diagram of an electromechanical power transfer system according to a possible embodiment of the invention in a quiescent state.

FIG. 1 is a high-level schematic diagram of an electromechanical power transfer system 2 for a vehicle (not shown) according to a possible embodiment of the invention in a quiescent state. Multiple dynamoelectric machines 4 each couple to an input disc of an electrically engageable clutch 6 by way of a machine drive shaft 8. Each clutch 6 may comprise any type of construction, such as a tooth, sprag, dog, cone or disc type. The engagement of each clutch 6 is preferably by way of an associated clutch solenoid 10. Alternatively, a mechanical actuator may engage each clutch 6. An output disc of each clutch 6 couples to a clutch drive gear 12 by way of a clutch drive shaft 14. Although FIG. 1 shows two of the machines 4 with associated clutches 6, the power transfer system 2 may have any number of such machines 4 with associated clutches 6, but at least two as shown.

A common jack shaft 16 couples to each clutch drive gear 12 by way of a jack shaft input gear 18. The jack shaft input gear 18 may have a different diameter than that of each clutch drive gear 12 to provide a desired primary gear speed ratio. The jack shaft 16 couples to an input shaft 20 by way of a jack shaft output gear 22 and an input shaft input gear 24. The input shaft input gear 24 may have a different diameter than that of the jack shaft output gear 22 to provide a desired secondary gear speed ratio. Alternatively, each clutch drive gear 12 may couple directly to the input shaft input gear 24 to eliminate the jack shaft 16 if such coupling provides a satisfactory gear speed ratio.

The input shaft 20 couples to an output shaft 26 with an axis of rotation generally parallel to that of the input shaft 20 by way of multiple transmission gear sets 28. However, the output shaft 26 could alternatively have an axis of rotation with an offset relative to that of the input shaft 20 if each of the transmission gear sets 28 comprises bevel gears. Although FIG. 1 shows four of the transmission gear sets 28a, 28b, 28c and 28d, the power transfer system 2 may have any number of such transmission gear sets 28, but at least two. Each transmission gear set 28 has an input gear 30 for coupling to the input shaft 20 and an output gear 32 for coupling to the output shaft 26. Each transmission gear set 28 also has an engageable coupling 34, such as a gear engagement spline or clutch. Each coupling 34 is preferably electrically engageable, although it may alternatively be mechanically engageable. Each coupling 34 may engage either its respective input gear 30 to the input shaft 20 or its respective output gear 32 to the output shaft 26. The engagement of each coupling 34 is preferably by way of an associated coupling solenoid 36. It is generally preferable, but not necessary, for each transmission gear set 28 to associate its coupling 34 with the slowest revolving one of its respective input gear 30 and output gear 32 to minimise coupling wear.

Optionally a transmission brake assembly 38 may couple to the output shaft 26 of the power transfer system 2 to facilitate a secure stationary position for parking or servicing the host vehicle. The output shaft 26 may couple to a final drive assembly 40. The final drive assembly 40 couples the output shaft 26 to a final drive shaft 42 through internal gearing that provides a desired final drive shaft speed reduction ratio. The final drive shaft 42 couples to a load 44. The load 44 typically comprises multiple traction devices for the host vehicle, such as tracks or tyres with associated drive wheels.

An electrical power source 46, such as an electric battery system, supplies electrical power for the host vehicle. A system controller 48 receives electrical power from the power supply 46 by way of a power supply bus 50 to energise itself and distribute electrical power to each machine 4 by way of a its own dynamoelectric machine supply bus 52. The system controller 48 may selectively engage each of the clutches 6 by energising its associated clutch solenoid 10 with a respective clutch engagement signal. The system controller 48 does so by energising each clutch solenoid 10 with a respective clutch engagement signal transmitted to it by way of an associated clutch signal bus 54. The system controller 48 may also selectively engage each of the coupling solenoids 36 with a respective transmission gear set engagement signal. The system controller 48 does so by energising each coupling solenoid 36 with a respective transmission gear set engagement signal transmitted to it by way of an associated coupling signal bus 56.

The system controller 48 may sense electrical faults in each machine 4 or its associated machine supply bus 52 by way of its own associated dynamoelectric machine circuit fault detector 58. Each fault detector 58 may detect electrical faults in its associated machine 4 or machine supply bus 52, such as electrical short circuit or open circuit conditions. Upon detecting such an electrical fault, each fault detector 58 may send a corresponding error signal to the system controller 48 by way of an associated error signal bus 60, either automatically or upon interrogation by the system controller 48.

The system controller 48 may sense the speed of the host vehicle, such as with a speed detector 62 coupled to the output shaft 26 as shown in FIG. 1, or alternatively coupled to some other point in the power transfer system 2 downstream of the output shaft 26, such as the final drive shaft 42. The speed detector 62 may send a speed signal to the system controller 48 by way of a speed signal bus 64, either automatically or upon interrogation by the system controller 48.

The system controller 48 may sense the applied torque of the power transfer system 2 to the load 44, such as with a torque detector 66 coupled to the final drive shaft 42 as shown in FIG. 1, or alternatively coupled to the output shaft 26 or some other point in the power transfer system 2 downstream of the output shaft 26. The torque detector 66 may send a torque signal to the system controller 48 by way of a torque signal bus 68, either automatically or upon interrogation by the system controller 48.

Figure 2:
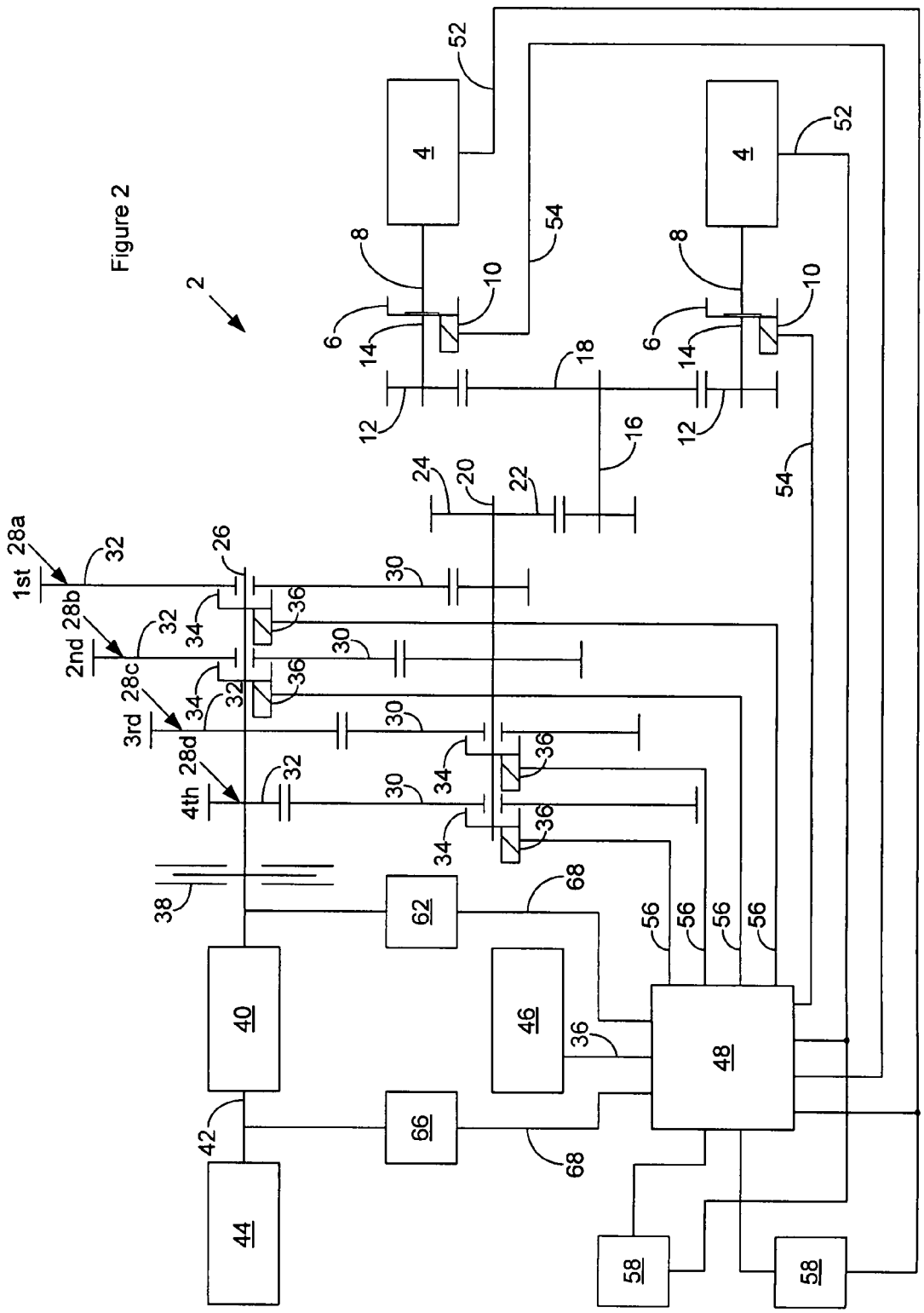
FIG. 2 is a high-level schematic diagram of the electromechanical power transfer system in FIG. 1 with clutches for its dynamoelectric machines engaged.

With the host vehicle at rest and the power transfer system 2 in a quiescent state as shown in FIG. 1, the system controller 48 typically disengages each clutch 6 with an appropriate clutch signal disengagement level for each clutch solenoid 10 and disengages each coupling 34 with an appropriate coupling signal disengagement level for each coupling solenoid 36. In each case, the disengagement level for each respective signal is typically zero. When initiating a start operation, the system controller 48 determines if any machine 4 or its associated machine bus 52 has a fault condition. It does this by sampling the level of each error signal that it receives from each associated fault detector 58. It then engages each clutch 6 for each machine 4 for which it receives an error signal level that indicates no fault from its associate fault detector 58. It does so with an appropriate clutch signal engagement level that typically has enough electrical potential and current to activate the associated clutch solenoid 10. FIG. 2 shows the power transfer system 2 with the clutches 6 so engaged.

Figure 3:
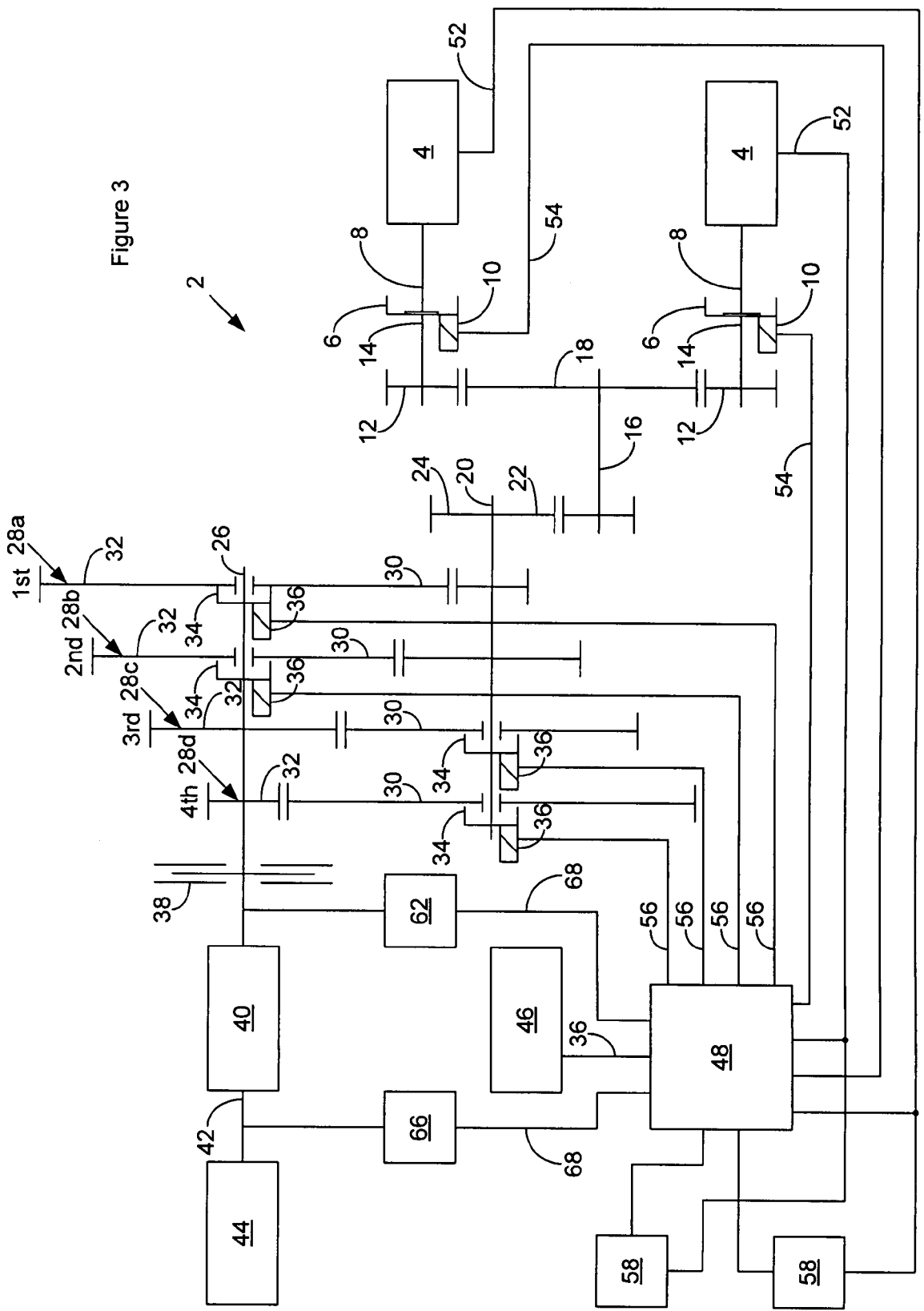
FIG. 3 is a high-level schematic diagram of the electromechanical power transfer system in FIG. 2 with a first transmission gear set engaged.

The system controller 48 then engages one of the transmission gear sets 28, typically the one with the highest gear reduction ratio, such as the transmission gear set 28a in FIG. 3. It does so with an appropriate coupling signal engagement level for its associated coupling solenoid 36 that typically has enough electrical potential and current to engage its associated coupling 34.

After the system controller 48 engages the appropriate clutches 6 and coupling 36, it transmits power to each machine 4 by way of its associated machine supply bus 52 for which its associated fault detector 58 transmits an error signal level indicating no electrical fault. As the power transfer system 2 transfers power from each powered machine 4 to the load 44, it may sense both speed of the host vehicle with the speed signal generated by the speed detector 62 and the torque applied to the load 44 with the torque signal generated by the torque detector 66. Depending upon the sensed speed and applied torque, the system controller 48 may terminate transmitted power to one or more of the machines 4 so that a minimum number of the machines 4 capable of supplying the sensed torque at the sensed speed drive the load 44. Likewise, if the system controller 48 then determines that the sensed speed and torque require additional machines 4, it may transmit power to an additional number of the machines 4.

Figure 4:
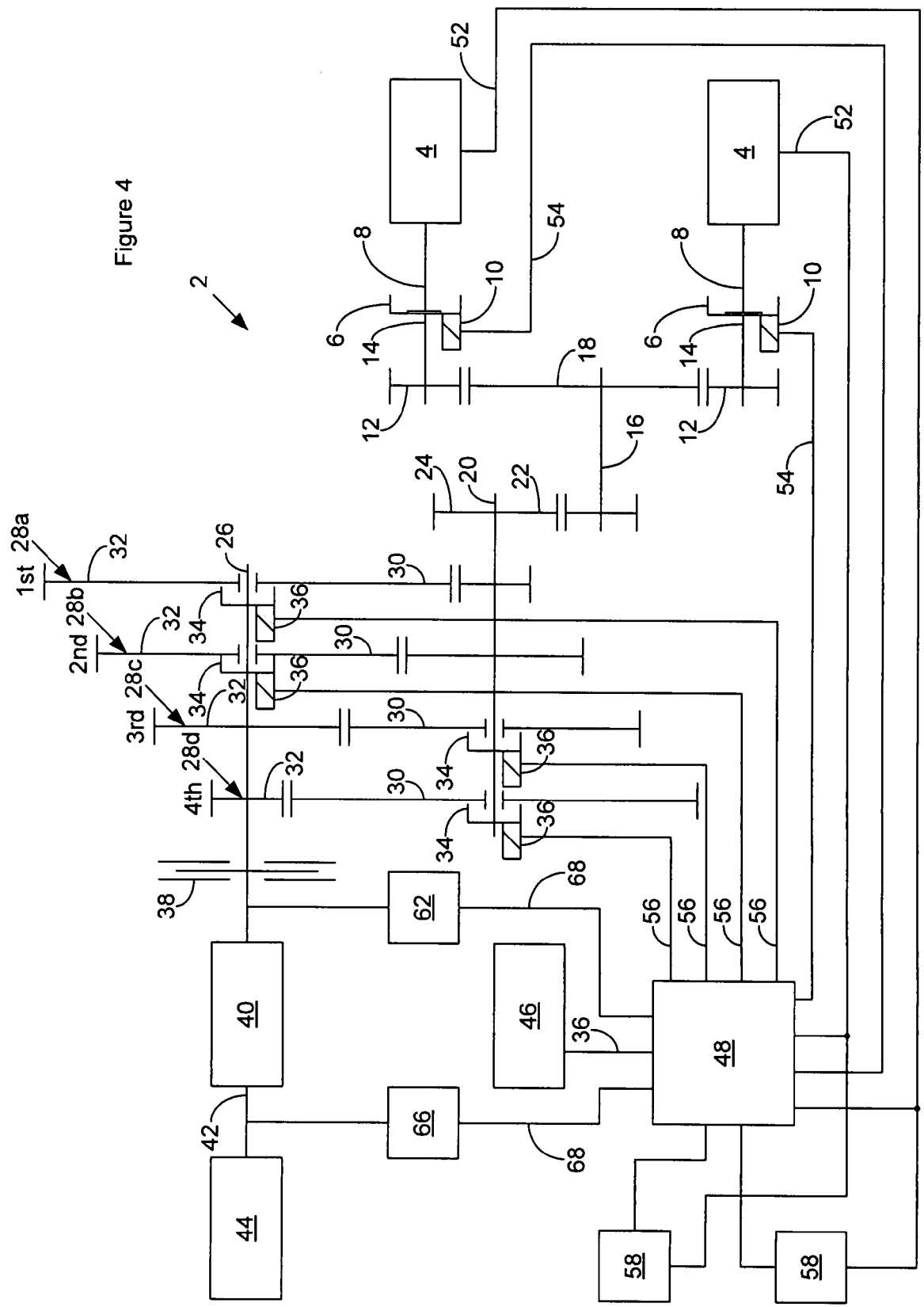
FIG. 4 is a high-level schematic diagram of the electromechanical power transfer system in FIG. 2 with a second transmission gear set engaged.

As the speed of the host vehicle increases, the system controller 48 engages a different one of the transmission gear sets 28 at a first predetermined speed, typically the one with the second highest gear reduction ratio, such as the transmission gear set 28b in FIG. 4. It does so by first terminating the transmission of power to each powered machine 4 to reduce its torque to zero, then disengaging the transmission gear set 28a by changing the coupling signal engagement level for its associated coupling solenoid 36 to a level that releases its associated coupling 34. The system controller 48 then engages transmission set 28b once the speed of the motors 4 fall enough to allow its associated coupling 34 to synchronise by changing the coupling signal engagement level for the its associated coupling solenoid 36 to a level that typically has enough electrical potential and current to engage its associated coupling 34. The system controller 48 then re-establishes power to each previously powered machine 4.

Figure 5:
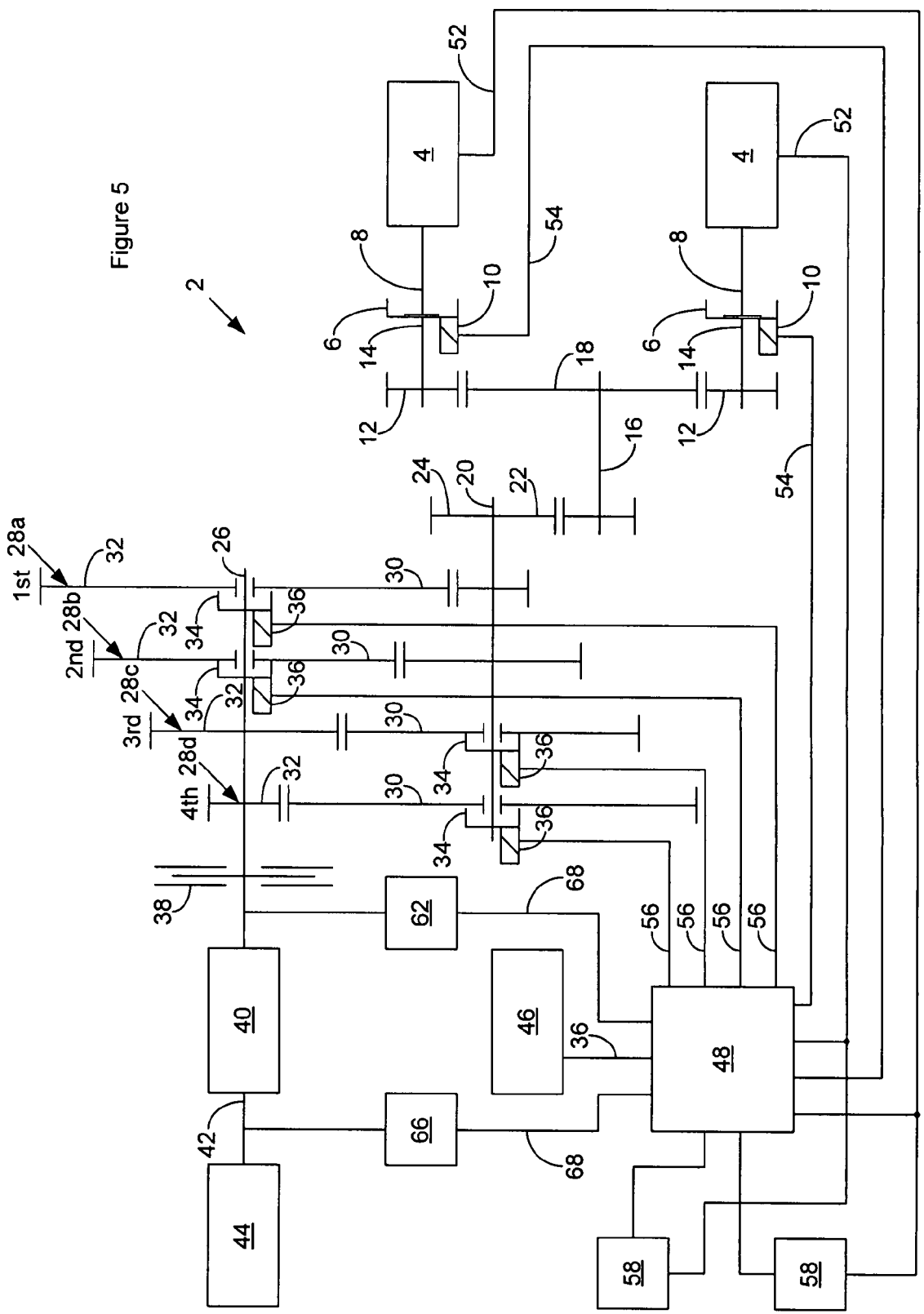
FIG. 5 is a high-level schematic diagram of the electromechanical power transfer system in FIG. 2 with a third transmission gear set engaged.

As the speed of the host vehicle increases still further, the system controller 48 engages a different one of the transmission gear sets 28 at a second predetermined speed, typically the one with the third highest gear reduction ratio, such as the transmission gear set 28c in FIG. 5. It does so by first disengaging the transmission gear set 28b by changing the coupling signal engagement level for its associated coupling solenoid 36 to a level that releases its associated coupling 34 and then engaging transmission set 28c by changing the coupling signal engagement level for the its associated coupling solenoid 36 to a level that typically has enough electrical potential and current to engage its associated coupling 34.

Figure 6:
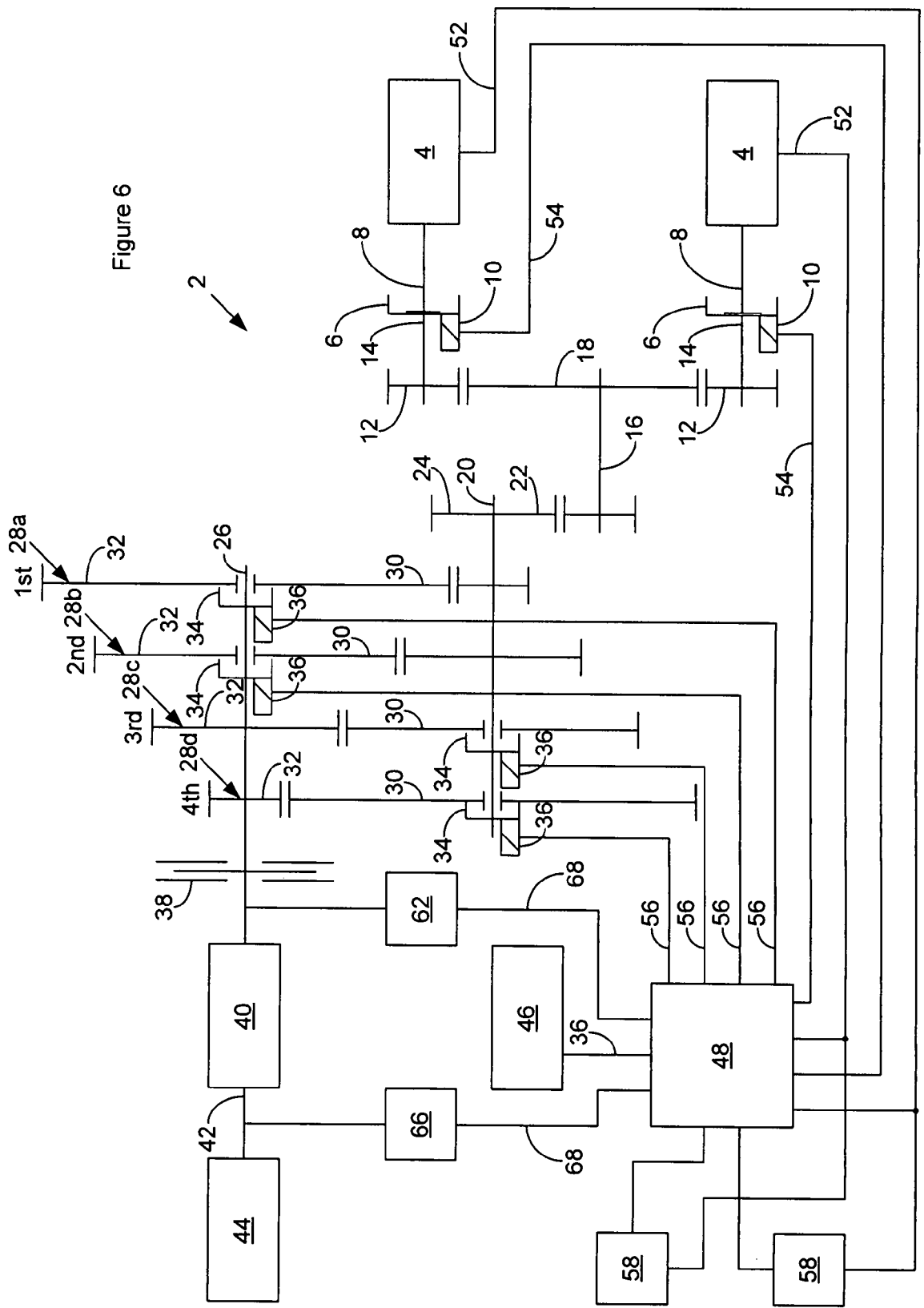
FIG. 6 is a high-level schematic diagram of the electromechanical power transfer system in FIG. 2 with a fourth transmission gear set engaged.

As the speed of the host vehicle increases even more, the system controller 48 engages a different one of the transmission gear sets 28 at a fourth predetermined speed, typically the one with the fourth highest gear reduction ratio, such as the transmission gear set 28d in FIG. 6. It does so by first disengaging the transmission gear set 28c by changing the coupling signal engagement level for its associated coupling solenoid 36 to a level that releases its associated coupling 34 and then engaging transmission set 28d by changing the coupling signal engagement level for the its associated coupling solenoid 36 to a level that typically has enough electrical potential and current to engage its associated coupling 34.

As the speed of the host vehicle decreases, the system controller 48 may similarly down-shift from any one of the engaged transmission gear sets 28 to any other one of the transmission gear sets 28. Furthermore, the system controller 48 may optionally switch the machines 4 from a motor mode to a generator mode to initiate regenerative braking of the host vehicle, in which case the machines 4 supply electrical power to the electrical power source 46.

As the torque applied by the power transfer system 2 to the load 44 changes, the system controller 48 may similarly up-shift or down-shift from any one of the engaged transmission gear sets 28 to any other one of the transmission gear sets 28 in response to predetermined levels of the torque signal from the torque sensor 66. Furthermore, the system controller may optionally change the number of machines 4 to which it transmits power to better match the sensed torque with any engaged transmission gear set 28.

The described embodiments of the invention are only some illustrative implementations of the invention wherein changes and substitutions of the various parts and arrangement thereof are within the scope of the invention as set forth in the attached claims.

The invention claimed is:

1. An electromechanical power transfer system for a vehicle, comprising:
   an electrical power source;
   a system controller;
   at least two dynamoelectric machines;
   a solenoid-operated clutch for each machine;
   a jack shaft coupled to the clutch for each machine;
   an input shaft coupled to the jack shaft;
   an output shaft with an axis of rotation generally parallel to that of the input shaft coupled to a load presented by the vehicle; and
   at least two transmission gear sets, each with solenoid-operated couplings, for coupling the input shaft to the output shaft;
   wherein the system controller selectively engages each machine clutch by energising its associated solenoid, selectively couples each transmission gear set by energising its associated solenoid and selectively transmits power from the power source to each engaged machine.

2. The power transfer system of claim 1, further comprising a fault detector for each machine circuit, wherein the system controller is responsive to an error signal generated by each fault detector and it terminates clutch engagement for any associated machine for which an error signal indicates a machine circuit fault.

3. The power transfer system of claim 1, further comprising a speed detector for detecting the speed of the vehicle, wherein the system controller is responsive to a speed signal generated by the speed detector and it engages a different one of the electrically engageable transmission gear sets with an associated transmission gear set engagement signal upon reaching a predetermined speed.

4. The power transfer system of claim 1, further comprising a torque detector for detecting the torque applied by the power transfer system to a load presented by the vehicle, wherein the system controller is responsive to a torque signal generated by the torque detector and it engages a different one of the electrically engageable transmission gear sets with an associated transmission gear set engagement signal upon reaching a predetermined torque.

5. The power transfer system of claim 4, wherein the system controller changes the number of machines to which it transmits power to better match the sensed torque with any engaged transmission gear set.

6. An electromechanical power transfer system for a vehicle, comprising:
   an electrical power source;
   a system controller;
   at least two dynamoelectric machines;
   a solenoid-operated clutch for each machine;
   a jack shaft coupled to the clutch for each machine;
   an input shaft coupled to the jack shaft;
   an output shaft with an axis of rotation generally parallel to that of the input shaft coupled to a load presented by the vehicle;
   a fault detector for each machine circuit;
   a speed detector for detecting the speed of the vehicle;
   a torque detector for detecting the torque applied by the power transfer system to the load presented by the vehicle; and
   at least two transmission gear sets, each with solenoid-operated couplings, for coupling the input shaft to the output shaft;
   wherein the system controller selectively engages each machine clutch by energising its associated solenoid, selectively couples each transmission gear set by energising its associated solenoid and selectively transmits power from the power source to each engaged machine, responds to an error signal generated by each fault detector and it terminates clutch engagement for any associated machine for which an error signal indicates a machine circuit fault, responds to a speed signal generated by the speed detector and it engages a different one of the electrically engageable transmission gear sets with an associated transmission gear set engagement signal upon reaching a predetermined speed and responds to a torque signal generated by the torque detector and it engages a different one of the electrically engageable transmission gear sets with an associated transmission gear set engagement signal upon reaching a predetermined torque.

\* \* \* \* \*